(12) United States Patent
Browne et al.

(10) Patent No.: US 8,618,921 B2
(45) Date of Patent: Dec. 31, 2013

(54) METHOD AND SYSTEM FOR IDENTIFYING WET PAVEMENT USING TIRE NOISE

(75) Inventors: Alan L. Browne, Grosse Pointe, MI (US); Shung H. Sung, Troy, MI (US); Nancy L. Johnson, Northville, MI (US); Jan H. Aase, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 978 days.

(21) Appl. No.: 12/615,344

(22) Filed: Nov. 10, 2009

(65) Prior Publication Data

US 2011/0109448 A1    May 12, 2011

(51) Int. Cl.
*B60Q 1/00*   (2006.01)
*G08B 21/00*  (2006.01)
*G08G 1/00*   (2006.01)
*H04R 29/00*  (2006.01)
*H04B 1/00*   (2006.01)

(52) U.S. Cl.
USPC ............. 340/438; 340/604; 340/901; 381/56; 381/86

(58) Field of Classification Search
USPC ..................... 340/438, 604; 381/56
See application file for complete search history.

(56) References Cited

U.S. PATENT DOCUMENTS

| 5,514,035 | A | * | 5/1996 | Denniston ...................... 454/121 |
| 5,521,594 | A | * | 5/1996 | Fukushima .................... 340/901 |
| 5,586,028 | A | * | 12/1996 | Sekine et al. ...................... 701/1 |
| 5,852,243 | A | * | 12/1998 | Chang et al. ..................... 73/659 |
| 6,577,941 | B2 | * | 6/2003 | Kawasaki et al. ............... 701/70 |
| 2005/0041819 | A1 | | 2/2005 | Brown |
| 2008/0129541 | A1 | * | 6/2008 | Lu et al. ......................... 340/905 |
| 2011/0200199 | A1 | * | 8/2011 | Wakao ............................ 381/56 |

FOREIGN PATENT DOCUMENTS

JP    8261993    * 10/1996 ............. G01B 21/30

* cited by examiner

*Primary Examiner* — George Bugg
*Assistant Examiner* — Jack K Wang

(57) ABSTRACT

A wet road surface detection system is provided for a vehicle driving on a road. The wet road surface detection system includes a sound sensing device coupled to the vehicle for capturing noise of the vehicle tires as the vehicle drives on a road surface. A processor processes sounds captured by the audible sensing device. The processor quantifies a variable sound level of the captured noise between a first frequency and a second frequency. The processor determines whether each quantified sound level between the first frequency and the second frequency is above a predetermined sound level threshold below the sound level at the first frequency. The processor determines that the vehicle is driving on a wet road surface in response to each quantified sound level between the first frequency and the second frequency being above a predetermined sound level threshold below the sound level at the first frequency.

23 Claims, 4 Drawing Sheets

METHOD AND SYSTEM FOR IDENTIFYING WET PAVEMENT USING TIRE NOISE

BACKGROUND OF INVENTION

An embodiment relates generally to detection of a wet road surface using noise measurements.

Precipitation on a driving surface causes several different issues for a vehicle. For example, water on a road reduces the coefficient of friction between the tires of the vehicle and the surface of the road resulting in vehicle stability issues. Typically, a system or subsystem of the vehicle senses for precipitation on the road utilizing some sensing operation which occurs when the precipitation is already negatively impacting the vehicle operation such as detecting wheel slip. Under such circumstances, the precipitation is already affecting the vehicle (e.g., wheel slip), and therefore, any reaction at this point becomes reactive. That is, to detect precipitation using wheel slip, the vehicle must be active in the unwanted condition (e.g., wheel slip) in order to detect it. As a result, such a system is reactive instead of proactive.

Another example of how precipitation negatively affects a vehicle is water ingestion into the air vents of a vehicle which leads to water ingestion into the engine. Some vehicles utilize supplemental air vents exterior of the vehicle body, such as air intake hood scoops, to reduce the temperature of the air supplied to the engine and to increase the density and pressure of the air thereby providing an improvement in power from the engine. The air intake hood scoop allows air to be admitted to the engine forward of an air cleaner or fuel injector. However, any precipitation entering the air intake hood scoop results in water ingestion directly to the engine which degrades engine performance. Precipitation into the air intake hood scoop could be the result of rain directly falling into the air intake hood scoop or may be the result of puddled water on the road surface being picked up and sprayed rearward by vehicle ahead of a driven vehicle. Therefore, it would be pertinent to identify a wet road surface prior to precipitation building up on the road surface where it can negatively affect the vehicle.

SUMMARY OF INVENTION

An advantage of an embodiment is an early detection of precipitation on a surface of a driven road for actuating mitigation devices for negating or mitigating the effects of precipitation to the vehicle. The system uses sound pressure of the vehicle tires on the surface of the road to determine if precipitation is present on the vehicle road and actuates devices for preventing water ingestion into the engine and for mitigating loss of traction due to the precipitation.

An embodiment contemplates a method for determining a wet road surface condition for a vehicle driving on a road. Tire noise is captured as a vehicle travels on a driving surface of the road using a sound sensing device. A variable sound level of the captured tire noise between a first frequency and a second frequency is captured. A determination is made whether each quantified sound level from the first frequency to the second frequency is above a predetermined sound level threshold below the sound level at the first frequency. A wet driving surface indicating signal is generated in response to determining that each quantified sound level above the first frequency to the second frequency is within the predetermined sound level threshold.

An embodiment contemplates a wet road surface detection system for a vehicle driving on a road. The wet road surface detection system includes a sound sensing device coupled to the vehicle for capturing noise of the vehicle tires as the vehicle drives on a road surface. A processor processes sounds captured by the audible sensing device. The processor quantifies a variable sound level of the captured noise between a first frequency and a second frequency. The processor determines whether each quantified sound level between the first frequency and the second frequency is above a predetermined sound level threshold below the sound level at the first frequency. The processor determines that the vehicle is driving on a wet road surface in response to each quantified sound level between the first frequency and the second frequency being above a predetermined sound level threshold below the sound level at the first frequency.

DETAILED DESCRIPTION

Figure 1:
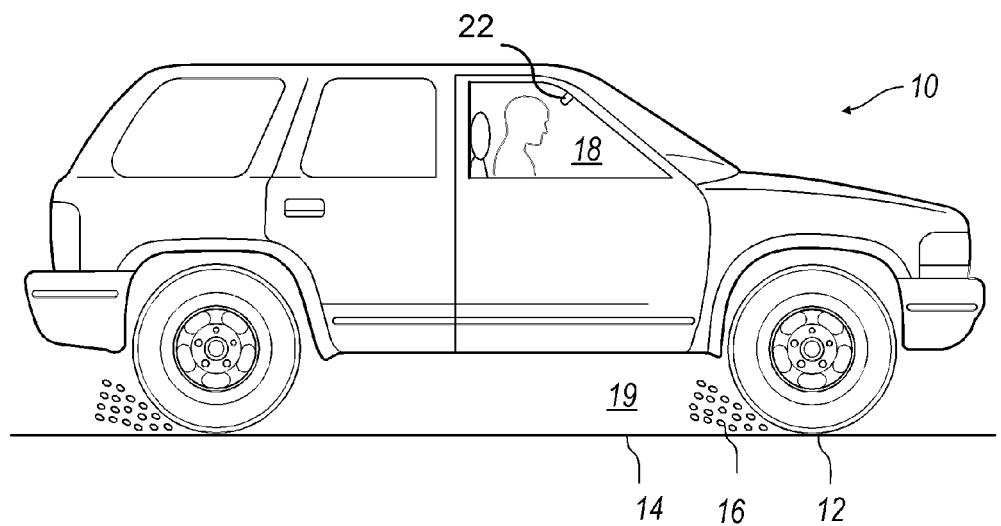
FIG. 1 is a perspective view of a vehicle incorporating a wet road surface detection system according to a first embodiment of the invention.

There is shown in FIG. 1, generally at 10, a vehicle having a set of vehicle tires 12 rotatably contacting a ground surface 14 of a vehicle road for moving the vehicle along the road. Precipitation 16 is shown disposed on the vehicle road 14 and is often displaced by the vehicle tires as the vehicle tires rotate over the wet vehicle road 14. It is often advantageous to know when the vehicle is traveling along a wet vehicle road 14 so that issues resulting from precipitation, such as engine degradation resulting from water entering exterior air intake vents or loss of traction, can be negated or at least mitigated. Precipitation entering air intake vents (e.g., air intake hood scoop or air intake side panel vents) may be directly caused by rain falling directly into the air intake vents or from puddles of precipitation formed on the road and being lifted into the air by the tires of a vehicle forward of the driven vehicle. Under such conditions, air baffles used to allow air flow through the air intake vents can be temporarily closed until it is determined that precipitation is no longer present, and therefore, no longer an issue.

Precipitation 16 on the vehicle road 14 can also result in a reduction of traction when driving on the wet road surface. The precipitation 16 disposed on the vehicle road 14 lowers the coefficient of friction between the vehicle tires 12 and the vehicle road 14. As a result, traction between the vehicle tires 12 and the vehicle road 14 is lowered. Loss of traction can be mitigated by warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle.

Figure 2:
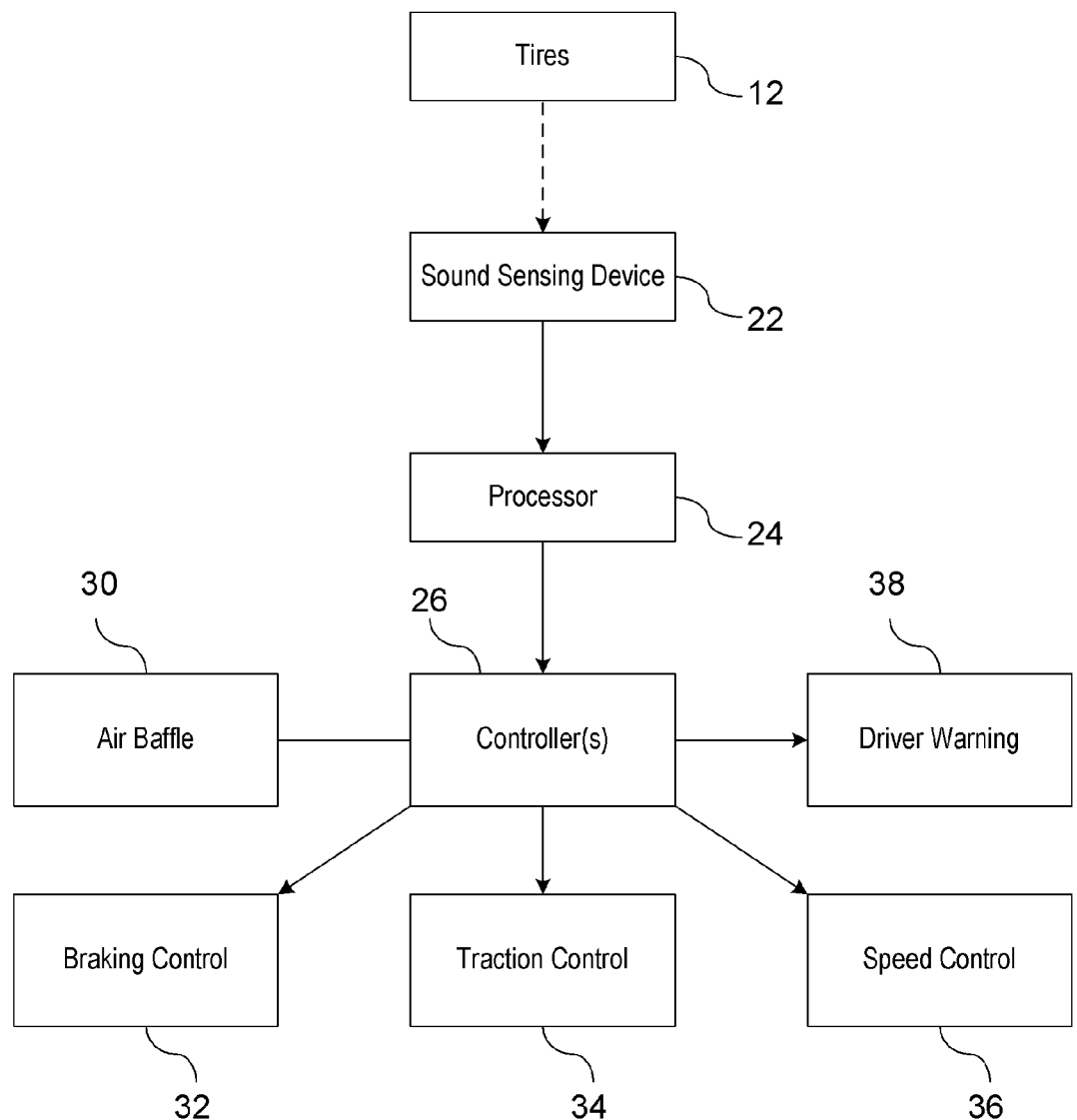
FIG. 2 is a block diagram of a wet road surface detection system according to the first embodiment of the invention.

FIG. 2 illustrates a block diagram of a wet road surface detection system. A set of vehicle tires traveling along a vehicle road is monitored by a sound sensing device 22. The sound sensing device 22 may include, but is not limited to, a microphone for capturing noise of the vehicle tires 12 as the vehicle travels on the road surface. The microphone 22 is preferably disposed within the interior of the passenger compartment 18 (as shown in FIG. 1). The wet road surface detection system may utilize a microphone already used in the vehicle which minimizes cost and additional packaging space. Such microphones already disposed within the vehicle interior passenger compartment 18 include vehicles equipped with an OnStar® system or similar. OnStar® is a subscription-based communications service currently provided on vehicles manufactured by General Motors, services that it provides including in-vehicle security, remote diagnostics systems, and turn-by-turn navigation through via a wireless communication link with a fixed entity. Alternatively, the wet road surface detection system can utilize a microphone or similar device disposed exterior of the passenger compartment 19.

Figure 3:
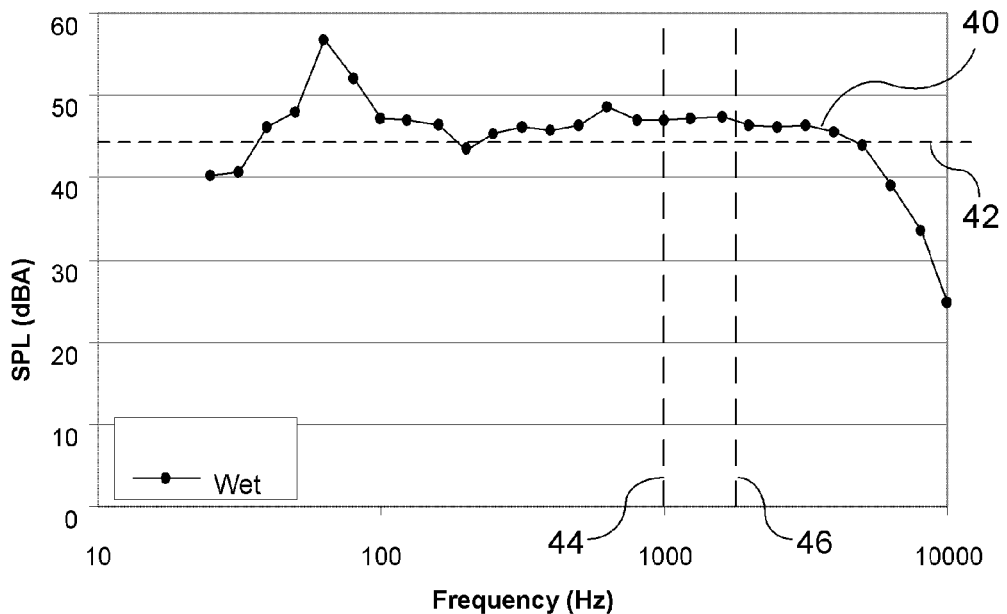
FIG. 3 is an exemplary graph of sound pressure data for a wet road surface according to the first embodiment of the invention.

The tire noise as generated by the vehicle tires 12 rotatably contacting the road surface is captured by the sound sensing device 22. A processor 24 processes and measures the sound level of the captured noise over a frequency range. An example of captured noise on a wet road surface that is converted to a sound level and displayed over a frequency range is shown generally at 40 in FIG. 3. In a preferred embodiment, the sound level is measured as a sound pressure level or a sound intensity level.

To determine whether the vehicle is driving on a wet road surface, the processor 24 compares the quantified sound level 40 to a predetermined sound level threshold 42. The predetermined sound level threshold 42 is a sound level that is below the quantified sound level 40 at the first frequency 44. If the quantified sound level 40 of the captured noise driving on the wet pavement remains above the predetermined sound level threshold 42 between the first frequency 44 and a second frequency 46, then the determination is made by the processor 24 that the vehicle is driving on a wet road surface.

The first frequency 44 is preferably about 1 kHz whereas the second frequency 46 is preferable about 5 kHz; however, the range of the second frequency may be expanded to 7 kHz. To make the determination that the vehicle is traveling on a wet road surface, the quantified sound level 40 must be greater than the predetermined sound level threshold 42 between the first frequency 44 and the second frequency 46. Alternatively, in some instances, based on the acoustics of the respective vehicle or location of the sound sensing device, the comparison to the threshold may possibly be based on driving at similar speeds, and on similar road pavement types, or below certain speeds (e.g. 35 mph).

The predetermined sound level threshold 42 may include a sound level range that is preferably at least 3 dBA (e.g., over 1 octave band) below the quantified sound level 40 at the first frequency 44. Alternatively, the predetermined sound level threshold 42 may be up to 10 dBA (e.g., over 3 octave bands) below the quantified sound level 40 above the first frequency 44. In addition to the vehicle speed, the frequency band, road type (e.g., smoothness of the road), tire tread pattern, and tire wear state may impact the quantified sound level and may be used to set the predetermined sound level threshold 42. Moreover, the frequency range between the first and second frequencies may be larger or smaller, than described herein, depending on the particular vehicle, vehicle speed, road type and measurement system.

Figure 4:
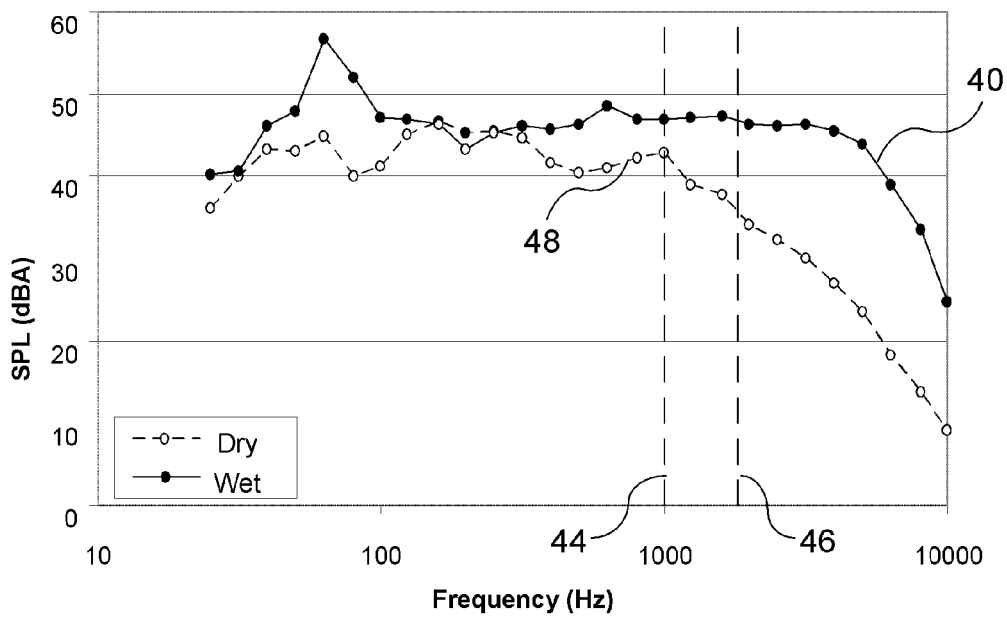
FIG. 4 is an exemplary graph of sound pressure data for a dry road surface and a wet road surface according to a second embodiment of the invention.

Another example of captured noise that is quantified as a sound level over a frequency range and compared to a predetermined sound level threshold is shown generally in FIG. 4. The predetermined sound level threshold includes a base-line sound level as illustrated 48. The base-line sound level 48 is a pre-measured sound level for a particular vehicle model and measuring system while driving at respective speeds along a dry road surface. The sound level data for the dry road surface is quantified over the frequency range between the first frequency 44 and the second frequency 46 as illustrated in FIG. 4. It is shown that the sound level of the captured noise decreases rapidly beginning at the first frequency 44 to the second frequency 46. In contrast, the sound level for the captured nose while driving on a wet pavement maintains a substantially same sound level between the first frequency 44 and the second frequency 46. The wet and dry sound levels for the road surfaces between the first frequency 44 and the second frequency 46 are compared in this sensitive frequency range for differentiating between wet and dry road surfaces. By comparing the sound level at these frequencies, and in some instances at similar speeds, similar tires and tire wear states, and on similar road pavement types, the road surface condition with wetness can be determined. To make a determination that the vehicle is traveling on a wet road surface, the quantified sound level 40 must be greater than the base-line sound level 48 throughout the sensitive frequency range. Moreover, additional conditions may be required such as the quantified sound level having to be greater than the dry road surface by at least a predetermined difference. For example, a condition may be imposed where the quantified sound level 40 at least 5 dBA of the base-line sound level between first frequency 44 and the second frequency 46. Alternatively, the predetermined difference between the quantified sound level 40 and the base-line sound level 46 may be greater than 5 dBA depending on the vehicle, the frequency band, the speed of the vehicle and the road and tire tread pattern types.

Referring again to FIG. 2, the processor 24 may be coupled to one or more controllers 26 for initiating or actuating a control action if precipitation is found to be on the road surface. As described earlier, various countermeasures may be actuated for mitigating the effects of precipitation entering the air vents or for mitigating a loss of traction as a result of precipitation on the road surface.

The controller 26 may be a controller directly controlling a mitigation device. For example, upon determining that a wet road is present the controller 26 may control the actuation of automatically opening and closing air baffles for preventing water ingestion into an engine of the vehicle. Under such conditions, the controller 26 automatically actuates the closing of the air baffles 30 when precipitation is found to be present on the road surface and re-opens the air baffles when precipitation is determined not to be present on the road surface.

The controller 26 may be a controller for an electrical or electro-hydraulic braking system 32 where a small braking force is autonomously applied to the vehicle wheels, which is unnoticeable by the driver, for removing precipitation build-up on the vehicle wheels. Removal of precipitation build-up from the wheels maintains an expected coefficient of friction between the vehicle brake actuators and the braking surface of the wheels when braking by the driver is manually applied.

The controller 26 may be a controller for a traction control system 34 which distributes power individually to each respective wheel for reducing wheel slip by a respective wheel when precipitation is present on the road surface.

The controller 26 may further be a controller for a cruise control system 36 which can deactivate cruise control or restrict the activation of cruise control when precipitation is present on the road surface.

The controller 26 may also be a controller for a driver information system 38 for providing warnings to the driver of the vehicle concerning precipitation detected on the vehicle road. Such a warning actuated by the controller 26 may alert the driver to the precipitation and recommend that the driver lower the vehicle speed to a speed that is conducive to the current environmental conditions, or the controller 26 may actuate a warning to maintain a safe driving distance to the vehicle forward of the driven vehicle. It should be understood that the controller 26, as described herein, may include one or more controllers that control an individual function or may control a combination of functions. Moreover, the wet pavement condition may be communicated to other vehicles utilizing a vehicle-to-vehicle or vehicle-to-infrastructure communication system.

Figure 5:
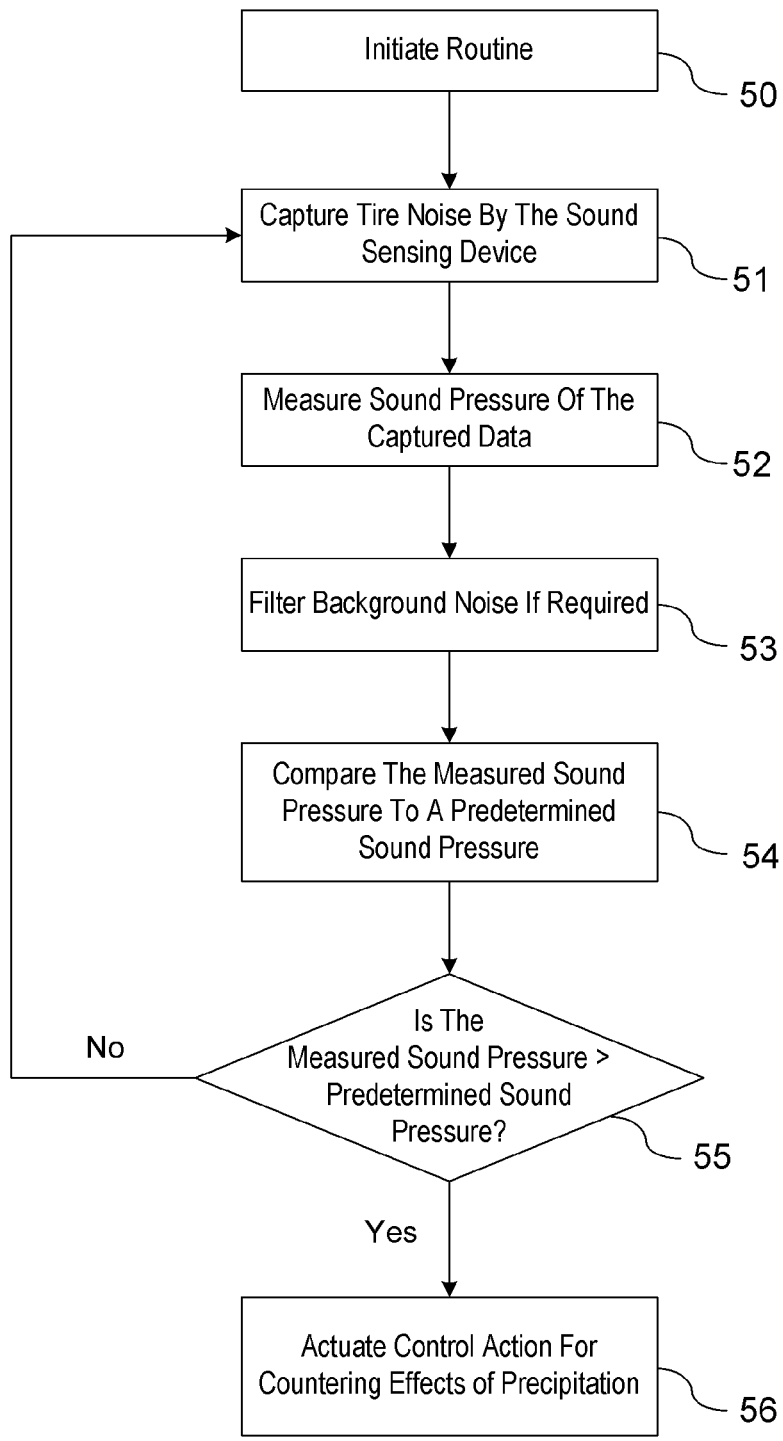
FIG. 5 is a flowchart of a method for detecting a wet road surface according to the first embodiment of the invention.

FIG. 5 illustrates a flowchart of a method for detecting a wet road surface. In step 50, the wet road detection routine is initiated. In step 51, tire noise is captured by the sound sensing device. The sound sensing device is preferably disposed within the vehicle passenger compartment for capturing the noise of the tires traveling on the road surface as measured from within the passenger compartment. Alternatively, the sound sensing device may be disposed exterior of the passenger compartment.

In step 52, the sound level of the captured noise is quantified. The sound level is quantified over a predetermined frequency range.

In step 53, filtering is performed to filter out interference noise (e.g., non-tire to road surface noise). Filtering is only required if the unwanted interference is present in the frequency range of interest that is being analyzed. Filtering may also be desired if the vehicle speed, tire tread pattern and the road surface texture types are such as to introduce specific high frequency tonalities in the sound trace. Filtering may also be performed on time-domain wave forms in addition to the frequency-domain wave forms.

In step 54, the quantified sound level is compared to a predetermined sound level threshold for determining whether precipitation is present on the road surface.

In step 55, the determination is made whether the quantified sound level is greater than a predetermined sound level threshold. If a determination is made that the sound level is below the predetermined sound level threshold, then it is determined that precipitation is not present and a return is made to step 51 to continue to monitor the tire noise. In step 55, if the determination is made that the sound level is greater than the predetermined sound level threshold, then the routine proceeds to step 56.

In step 56, a controller actuates a control action for countering the effects that the precipitation may have on the traction of the vehicle or the water ingestion into the engine. The control action may be a warning to a driver of the vehicle or the control action may include providing a signal to a subsystem (e.g., ABS) indicating the detection of wet pavement where the subsystem utilizes the information to further verify whether wet pavement is present and take action accordingly.

While certain embodiments of the present invention have been described in detail, those familiar with the art to which this invention relates will recognize various alternative designs, filtering process and embodiments for practicing the invention as defined by the following claims.

What is claimed is:

1. A method for determining a wet road surface condition for a vehicle driving on a road, the method comprising the steps of:
    capturing tire noise as a vehicle travels on a driving surface of the road using a sound sensing device, the sound sensing device being coupled to the vehicle;
    quantifying a variable sound level of the captured tire noise at each successive frequency between a first frequency and a second frequency by a vehicle processor;
    determining whether each quantified sound level at each successive frequency between the first frequency and the second frequency is above a predetermined sound level threshold; and
    the vehicle processor generating a wet driving surface indicating signal in response to determining that each quantified sound level between the first frequency and the second frequency is above the predetermined sound level threshold.

2. The method of claim 1 wherein the first frequency is about 1 kHz and the second frequency is about 5 kHz, wherein only the successive frequencies between 1 kHz and 5 kHz are analyzed for determining whether the quantified sound level at each successive frequency between 1 kHz and 5 kHz are above the predetermined sound level threshold.

3. The method of claim 2 wherein the first frequency is about 1 kHz and the second frequency is between 5 kHz and 7 kHz, wherein only the successive frequencies between the first and second frequencies are analyzed for determining whether the quantified sound level at each successive frequency between first and second frequencies are above the predetermined sound level threshold.

4. The method of claim 2 wherein the predetermined sound level threshold is a fixed sound level.

5. The method of claim 4 wherein the fixed sound level is a sound level value below the quantified sound level of the first frequency.

6. The method of claim 2 wherein the predetermined sound level threshold is a baseline sound level of the vehicle driving on a dry road surface, the baseline sound level decreasing from first frequency to the second frequency, wherein the quantified sound level of the captured noise of the vehicle driving on the wet road surface between the first frequency and the second frequency is greater than the predetermined sound level threshold between the first frequency and the second frequency.

7. The method of claim 1 wherein the sound level is measured as a sound pressure level.

8. The method of claim 1 wherein the sound level of the tire noise is measured from an exterior of a passenger compartment of the vehicle.

9. The method of claim 1 wherein the sound level of the tire noise is measured from within an interior of a passenger compartment of the vehicle.

10. The method of claim 1 wherein the wet driving surface indicating signal is used to alert a driver of a potential reduced traction between vehicle tires and the road surface.

11. The method of claim 1 wherein the wet driving surface indicating signal is used to warn a driver of the vehicle against a use of cruise control.

12. The method of claim 1 wherein the wet driving surface indicating signal is used to notify a driver to reduce a vehicle speed.

13. The method of claim 1 wherein the wet driving surface indicating signal is used to warn a driver to maintain a greater following distance to a vehicle forward of the driven vehicle.

14. The method of claim 1 wherein the wet driving surface indicating signal is provided to a vehicle controller, the controller autonomously actuating vehicle braking for mitigating condensation build-up on vehicle brakes.

15. The method of claim 1 wherein the wet driving surface indicating signal is provided to a wireless communication system for alerting other vehicles of the wet road surface condition.

16. A wet road surface detection system for a vehicle driving on a road, the wet road surface detection system comprising:
- a sound sensing device coupled to the vehicle for capturing noise of the vehicle tires as the vehicle drives on a road surface; and
- a vehicle processor for processing the sounds captured by the audible sensing device, the vehicle processor quantifying a variable sound level of the captured noise at each successive frequency between a first frequency and a second frequency;
- wherein the vehicle processor determines whether each quantified sound level at each successive frequency between the first frequency and the second frequency is above a predetermined sound level threshold, and wherein the vehicle processor determines that the vehicle is driving on a wet road surface in response to each quantified sound level at each successive frequency between the first frequency and the second frequency being above a predetermined sound level threshold.

17. The wet road surface detection system of claim 16 wherein the audible sensing device is a microphone disposed within a passenger compartment of the vehicle.

18. The wet road surface detection system of claim 16 wherein the audible sensing device is a microphone disposed exterior of a passenger compartment of the vehicle.

19. The wet road surface detection system of claim 16 wherein the captured sound level is a captured sound level pressure level of the captured noise over the frequency range.

20. The wet road surface detection system of claim 16 further comprising an in-vehicle warning device for enabling a warning to a driver of the vehicle concerning the wet road surface condition.

21. The wet road surface detection system of claim 16 further comprising a controller modifying a speed control parameter.

22. The wet road surface detection system of claim 16 further comprising a controller modifying a traction control parameter.

23. A method for determining a wet road surface condition for a vehicle driving on a road, the method comprising the steps of:
- capturing tire noise as a vehicle travels on a driving surface of the road using a sound sensing device, the sound sensing device being coupled to the vehicle;
- quantifying a variable sound level of the captured tire noise at each successive frequency between a first frequency and a second frequency by a vehicle processor;
- determining whether each quantified sound level at each successive frequency between the first frequency and the second frequency is above a predetermined sound level threshold; and
- the vehicle processor generating a wet driving surface indicating signal in response to determining that each quantified sound level between the first frequency and the second frequency is above the predetermined sound level threshold, the wet driving surface indicating signal being provided to a vehicle controller for shutting baffles on an air intake scoop of a vehicle for preventing water ingestion.

* * * * *